United States Patent [19]

Kling et al.

[11] Patent Number: 4,915,060
[45] Date of Patent: Apr. 10, 1990

[54] FEED TROUGH WITH ROCKING ACTION

[76] Inventors: Kim W. Kling; Chris A. Kling, both of R.R. 1, Box 410, Belle Fourche, S. Dak. 57717

[21] Appl. No.: 247,701

[22] Filed: Sep. 22, 1988

[51] Int. Cl.⁴ ............................................. A01K 39/00
[52] U.S. Cl. ....................................................... 119/61
[58] Field of Search .................... 119/57, 58, 61, 52 R, 119/74, 63, 64; D30/121, 129, 130, 131, 132, 133; 220/69, 70.1, 83

[56] References Cited

U.S. PATENT DOCUMENTS

| D. 300,278 | 3/1989 | Morrell | D30/129 |
|---|---|---|---|
| 534,957 | 2/1895 | Ingraham | 119/61 |
| 654,427 | 7/1900 | Atsatt | 119/61 |
| 700,522 | 5/1902 | Maginnis | 119/61 |
| 927,197 | 7/1909 | Weaver et al. | 119/61 |
| 1,378,263 | 5/1921 | Miller et al. | 119/61 |
| 1,553,746 | 9/1925 | Bulla | 119/63 |
| 1,627,852 | 5/1927 | Kroll | 220/69 X |
| 1,727,610 | 9/1929 | Kramer | 119/61 |
| 1,742,019 | 12/1929 | Williams et al. | 119/61 |
| 1,749,808 | 3/1930 | Grenne | 119/61 |
| 2,691,362 | 10/1954 | Moyer et al. | 119/61 |
| 3,001,667 | 9/1961 | Whiting | 220/69 |
| 4,258,665 | 3/1981 | Coots | 119/61 |

FOREIGN PATENT DOCUMENTS

| 1212880 | 3/1960 | France | 119/61 |
| 2514994 | 4/1983 | France | 119/61 |

Primary Examiner—Robert Peshock
Assistant Examiner—R. Thomas Price
Attorney, Agent, or Firm—Dorsey & Whitney

[57] ABSTRACT

A feed trough with rocking action for feeding livestock comprises a frusto-cylindrical body member being adapted to form a horizontally disposed channel having two side walls and a rounded bottom wall in contact with the ground. Each end of the channel is closed by an end wall that is connected to the body member and each of the side walls has a roll stop attached to the side wall such that the roll stop is not in contact with the ground when the body member is in an upright position with the rounded bottom wall in contact with the ground. The combination of the rounded bottom wall and the roll stops provide a rocking action, such that when the trough is stepped on by an animal, the trough will rock in the direction of the force exerted by the animal until the roll stop comes into contact with the ground and operates to return the trough to its upright position.

8 Claims, 1 Drawing Sheet

U.S. Patent     Apr. 10, 1990     4,915,060
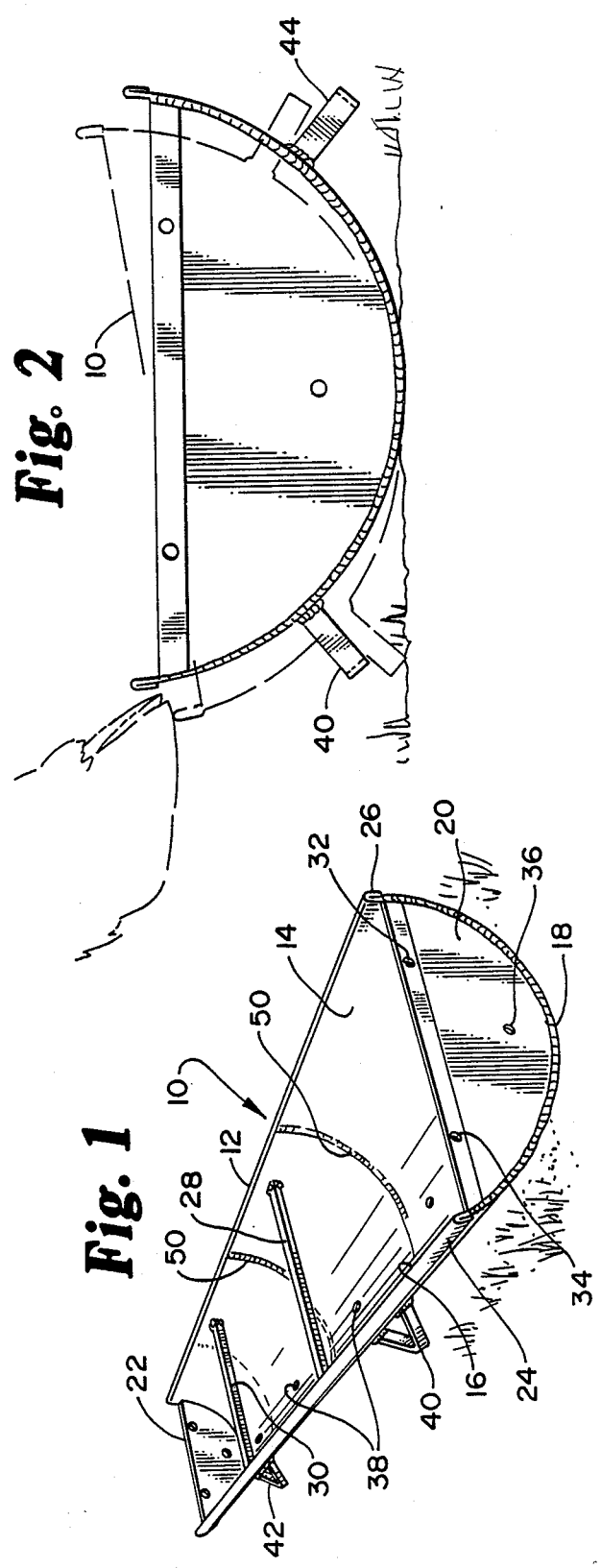
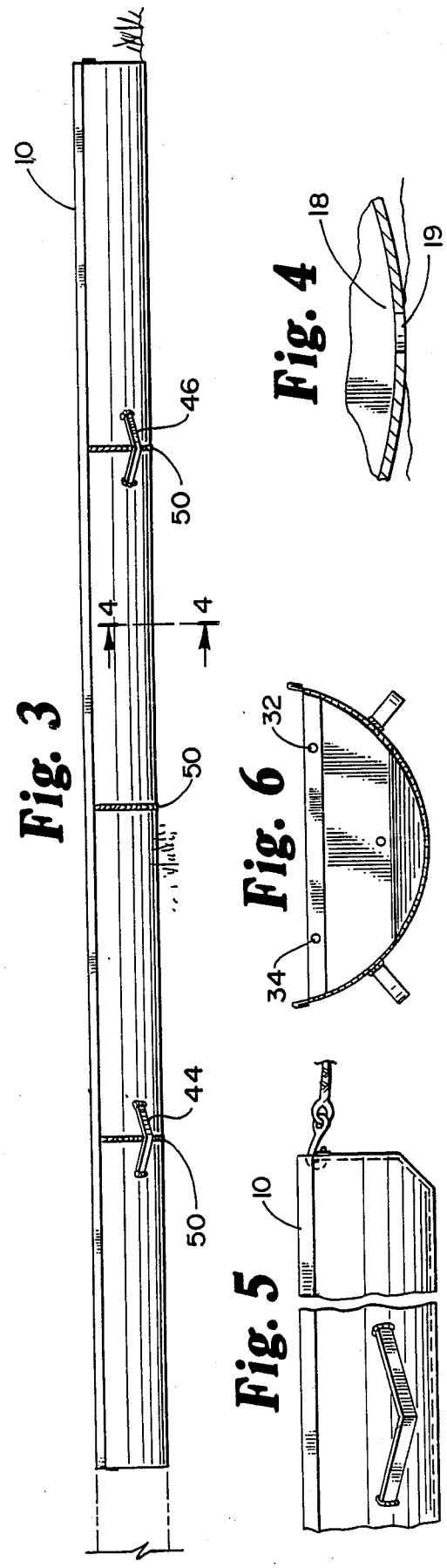

FEED TROUGH WITH ROCKING ACTION

TECHNICAL FIELD

The present invention relates generally to the field of livestock feed troughs. More particularly, the present invention relates to an improved trough for feeding dry grains or the like to livestock in an open field or rangelands, the trough being designed to use a rocking action to prevent damage to the feed trough when stepped on by livestock.

BACKGROUND ART

Most prior art feed troughs for use in an open field utilize some type of legs or support members as a means for maintaining the trough in an upright position so that it is accessible to the animals. For example, U.S. Pat. Nos. 654,427, 927,197, 1,378,263, 1,727,610, 1,742,019, 1,749,808 and 2,691,362. The disadvantage with such legs or support members is that they are rigid and can break or give out if the animal steps in the feed trough. In addition, the legs and support members make it difficult to transport and relocate these feed troughs to remote locations, as is often necessary when feeding livestock on an open rangelands.

Also known in the art are various semicircular feed troughs that are placed directly on the ground without legs or support members. For example, U.S. Pat. No. 700,522. While a semicircular feed trough does not have legs or support members that may break, there is nothing to prevent the trough from tipping or turning over when an animal steps in the trough, thereby spilling the feed and making the trough inaccessible to the livestock.

Although the present designs for feed troughs are adequate for some uses, it would be advantageous to have a simple and inexpensive design for a feed trough that could not be damaged by livestock and would remain accessible to the animals even when stepped in, yet could be easily transported and maintained.

SUMMARY OF THE INVENTION

In accordance with the present invention, a feed trough with rocking action is provided for feeding livestock, particularly livestock on open rangelands. The feed trough includes a frusto-cylindrical body member being adapted to form a horizontally disposed channel having two side walls and a rounded bottom wall in contact with the ground. Each end of the channel is closed by an end wall that is connected to the body member and each of the side walls has a roll stop attached to the side wall such that the roll stop is not in contact with the ground when the body member is in an upright position with the rounded bottom wall in contact with the ground. The combination of the rounded bottom wall and the roll stops provide a rocking action that allows the present invention to overcome the deficiencies in the prior art. When the trough is stepped on by an animal, the trough will rock in the direction of the force exerted by the animal until the roll stop comes into contact with the ground and operates to return the trough to its upright position.

Accordingly, a primary objective of the present invention is to provide a feed trough with rocking action that will not be damaged when stepped in or on by livestock.

Another objective of the present invention is to provide a feed trough of a simple and inexpensive design for use in feeding livestock on open rangelands that is easily transported and maintained.

A further objective of the present invention is to provide a feed trough with rocking action that will discourage livestock from stepping in the trough, thereby decreasing the damage to the trough and the amount of feed spilled.

These and other objectives of the present invention will become apparent with reference to the drawings, the description of the preferred embodiment and the appended claims.

DESCRIPTION OF THE DRAWINGS

FIG. 1 is a perspective view of the preferred embodiment of the present invention laying on the ground and shown empty.

FIG. 2 is an end elevational view of the subject of FIG. 1 with an animal hoof shown causing the trough to rock to the stop position shown in dashed line.

FIG. 3 is a side elevational view of the subject of the preceding figures and showing a plurality of extensions of the present invention.

FIG. 4 is an enlarged fragmentary detail section taken along line 4—4 in FIG. 3.

FIG. 5 is a fragmentary side elevational view of an alternate form of the preset invention.

FIG. 6 is an end elevational view of the alternate form shown in FIG. 5.

DESCRIPTION OF THE PREFERRED EMBODIMENT

Referring to FIG. 1, a preferred embodiment of a feed trough with rocking action is shown. A trough 10 for feeding livestock on open rangelands is comprised of a frusto-cylindrical body member 12 being adapted to form a horizontally disposed channel having two side walls 14 and 16 and a rounded bottom wall 18 that is in contact with the ground when the trough 10 is in an upright position. A pair of frusto-circular end walls 20 and 22 are disposed within the body member 12 at opposite ends of the body member 12 to close the ends of the channel. The top edges 24 and 26 of each of the side walls 14 and 16 are rolled to prevent the livestock from being cut. A pair of cross supports 28 and 30 are positioned between the side walls 14 and 16 at evenly spaced intervals along the channel to add stability to the body member 12 and prevent flexing or bending along the longitudinal axis when the trough 10 is stepped on by an animal or when it is transported from one location to another. To aid in transporting the trough 10, a pair of tow holes 32 and 34 are located along the upper edge of the end wall 20. The two holes 32 and 34 also serve as bolt holes for bolting two or more troughs 10 together to form a trough of the desired length. As shown in FIG. 1, the tow holes 32 and 34 are drilled through the upper edge of the end wall 20, the upper edge of the end wall 20 also being rolled to prevent the livestock from cutting themselves and to provide a reinforced area for the two holes 32 and 34. Each end wall 20 and 22 is also provided with a drain hole 36 for allowing moisture to drain from the interior of the trough 10. Drain holes 38 are also provided in the bottom wall 18.

To overcome the deficiencies in the prior art, each of the side walls 14 and 16 are provided with at least one resilient roll stop 40, 42, 44 and 46. The roll stops 40, 42, 44 and 46 are each comprised of an outwardly bowed strip of metal or other resilient material that is affixed at each end to the side wall and oriented in a generally horizontal manner. Unlike the legs or support members of current feed troughs, the roll stops 40, 42, 44 and 46 are located on the side walls 14 and 16 such that they are not in contact with the ground when the trough 10 is an upright position with the rounded bottom wall 18 in contact with the ground. As shown in FIG. 2, when the trough 10 is stepped on by the hoof an animal, the trough 10 will rock in the direction of the force exerted by the animal until the roll stop 40 comes into contact with the ground. Unlike conventional semi-circular feed troughs, the combination of the resilient nature of the roll stop 40 and the rounded bottom 18 will return the trough to the upright position when the animal steps off the trough 10. The rocking action of the present invention also serves as a deterrent to the livestock stepping in the trough 10. Livestock in general, and particularly hoofed animals, dislike the unstable nature of stepping on the trough 10 with its rocking action. The rocking action gives the animals the sensation of stepping on something unstable and the animals are less likely to step on or in the trough 10. As a result, there is less damage to the trough 10 and less feed spilled on the ground than with feed troughs of conventional design. Even when an animal does step in or in the trough 10, the rocking action helps prevent damage to the structure of the trough by allowing the trough 10 to give in response to the force being exerted by the weight of the animal. Consequently, the trough 10 of the present invention can be constructed more economically than conventional troughs because the trough 10 does not have to be designed to withstand the full force of an animal stepping on or in the trough.

In a preferred embodiment, the body member 12 is comprised of four sections of 14 gauge steel formed to create a frusto-circular channel having dimensions of 5 feet long by 19 inches wide by 9 inches deep. The four sections are fastened together by wields 50 as shown in FIG. 1. As shown in FIG. 4, the curvature of the rounded bottom 18 is gradual enough to provide a center portion 19 that is in contact with the ground and is sufficiently flat enough to support the trough 10 in an upright position during normal operation, but still allow the trough 10 to rock when a force is exerted on the trough, such as when an animal steps in it. The roll stops 40 and 44, and 42 and 46, are positioned opposite one another on the respective side walls 14 and 16 approximately 4 inches off the ground when the trough 10 is in an upright position. The roll stops 40, 42, 44 and 46 are made of ¼ inch steel straps 16 inches long by 1 inch wide. The cross supports 28 are made of 1 inch square tubing and are welded to the side walls 14 and 16 approximately 1 inch below the upper edge. Although the trough 10 is described in the preferred embodiment as being constructed out of steel, other materials could also be used to construct the trough and still be within the scope of the present invention. For example, the body member 12 could be formed from a heavier plastic material like PVC as a single channel, instead of four separate sections.

In an alternative embodiment shown in FIGS. 5 and 6, the structure of the end walls 20 and 22 has been modified to make it easier to tow the trough 10 by attaching a tow rope to the tow holes 32 and 34 as shown in FIG. 5. Instead of being perpendicular to the bottom wall 18, the end walls 20 and 22 are beveled at an angle to prevent the buildup of dirt in front of the trough 10 as it is being towed from one location to another in the field. It will be seen that any number of end wall structures could be used and still be within the scope of the present invention. For example, the end wall 20 might comprise a semispherical dome so that is attached to the body member 12 to present a curved, rather than a flat end of the trough 10; or the end wall 20 may only extend halfway from the bottom wall 18 to the top of the side wwlls 14 and 16, with another support member 28 connecting the two side walls 14 and 16 at the top above the end wall 20.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A trough for feeding livestock, comprising:
    a frusto-cylindrical body member forming a horizontally disposed channel having an elongated opening, two side walls, each side wall having a top edge adjacent the elongated opening of the channel, and a rounded bottom wall in contact with the ground;
    a pair of end walls operably connected to the body member at opposite ends of the body member to close the ends of the channel; and
    at least one roll stop affixed to each of the side walls below the top edge such that the roll stop is not in contact with the ground when the body member is an upright position with the rounded bottom wall in contact with the ground;
    whereby when a stepping force is exerted on the body member by an animal, the body member will rock in the direction of the stepping force until the roll stop comes into contact with the ground and operate to return the body member to the upright position.

2. The trough of claim 1 wherein the roll stops are comprised of an outwardly bowed strip of resilient material affixed at each end of the strip to the side wall and oriented in a generally horizontal manner.

3. The trough of claim 2 wherein the roll stops are a strip of spring steel.

4. The trough of claim 1 wherein the end walls are a pair of frusto-circular sheets of material having a curvature matching the interior of the body member and being disposed within the body member.

5. The trough of claim 1 wherein the end walls are beveled to allow the trough to be towed in a direction perpendicular to the channel.

6. The trough of claim 1 wherein the end walls further includes at least one two hole.

7. The trough of claim 1 wherein the trough further comprises at least one cross support member disposed between the two side walls.

8. The trough of claim 1 wherein the upper edges of the side walls are rolled to prevent the livestock from cutting themselves on the edges.

* * * * *